United States Patent [19]

Nakatani

[11] Patent Number: 5,438,657
[45] Date of Patent: Aug. 1, 1995

[54] DOCUMENT PROCESSING APPARATUS FOR EXTRACTING A FORMAT FROM ONE DOCUMENT AND USING THE EXTRACTED FORMAT TO AUTOMATICALLY EDIT ANOTHER DOCUMENT

[75] Inventor: Eisaku Nakatani, Oome, Japan

[73] Assignee: Casio Computer Co., Ltd., Tokyo, Japan

[21] Appl. No.: 29,827

[22] Filed: Mar. 11, 1993

[30] Foreign Application Priority Data

| Apr. 24, 1992 | [JP] | Japan | 4-132061 |
| Apr. 24, 1992 | [JP] | Japan | 4-132062 |
| Apr. 24, 1992 | [JP] | Japan | 4-132063 |
| Apr. 24, 1992 | [JP] | Japan | 4-132064 |
| Apr. 24, 1992 | [JP] | Japan | 4-132065 |
| Apr. 24, 1992 | [JP] | Japan | 4-132066 |

[51] Int. Cl.⁶ .................................. G06F 17/22
[52] U.S. Cl. .................... 395/148; 395/146
[58] Field of Search .................. 395/144–149; 364/419.1, 419.19

[56] References Cited

U.S. PATENT DOCUMENTS

| 4,358,824 | 11/1982 | Glickman et al. | 364/200 |
| 4,751,740 | 6/1988 | Wright | 382/61 |
| 4,965,763 | 10/1990 | Zamora | 364/900 |
| 4,970,665 | 11/1990 | Doi et al. | 395/148 |
| 5,159,667 | 10/1992 | Borrey et al. | 395/148 |
| 5,173,853 | 12/1992 | Kelly et al. | 395/148 |
| 5,323,312 | 6/1994 | Saito et al. | 364/419.1 |

OTHER PUBLICATIONS

Ansen, "Document Architecture Standards Evolution", AT&T Tech. Journal, 68(1989) Jul./Aug., No. 4, pp. 33–44.

Primary Examiner—Heather R. Herndon
Assistant Examiner—Joseph R. Burwell
Attorney, Agent, or Firm—Frishauf, Holtz, Goodman & Woodward

[57] ABSTRACT

Document data stored in a document storage area are extracted line by line to analyze the structure of the document data. The document layout information is extracted from the analysis result. The extracted layout information is stored, as learning data, in a document layout information learning area. In format conversion, the document data to be output, which is extracted in the same manner as described above, is converted on the basis of the learning data. Document data having a consistent layout is output to a CRT or a printer in accordance with the converted layout information.

16 Claims, 17 Drawing Sheets

FIG.2

```
     COLUMN POSITION
ROW   01    10    20    30    40    50    60
POSI-
TION
 01   ▽                                          October 23, 1991 ▽
 02   ▽           Business  Trip  Report ▽
 03   ▽
 04   To:   The director of business department ▽
 05         (Business department second section) Shinichi YAMAMOTO ▽
 06   ▽
 07         I have made a business trip to the Yokohama city on October 20
 08   to 22 of 1991 to hold a meeting on our products and for sales
 09   promotion, the details of whice are given below. ▽
 10   ▽
 11   ▽                         Remarks ▽
 12   ▽
 13   1. Destination of Visit ▽
 14          I visited Yokohama Products Company and Taiyo
 15       Trading Company on October 20 and Shinwa Trading
 16       Company's Yokohama Branch Office and Kyowa Trad-
 17       ing Company on October 21. ▽
 18   ▽
 19   2. Results and Report Items ▽
 20   ▽
 21       ①I made an extensive explanation to Yokohama Prod-
 22          ucts Company about the details of our Products.
 23          This company awaked a great deal of interest in
 24          our products and orders are to be expected short-
 25          ly. ▽
 26       ②Taiyo Trading Company and Shinwa Trading Company
 27          aroused some interest in our products, but our
 28          sales promotion is little to be expected at pres-
 29          ent in view of their intimate business connection
 30          with Shineiwa Trading Company, our rival company.
 31          A business prospect is bright if we carry out a
 32          vigorous sales promotion campaign. ▽
 33   ▽
 34                                                        Period ▽
```

(NOTE) ▽ ... shows a new line entered

FIG.3

```
ROW    COLUMN POSITION
POSI-  01       10       20       30       40       50       60
TION
01                                                   November 15, 1991▽
02                                        (Business planning section) Tadashi NAKAMRA▽
03
04                              Business Trip Report▽
05
06     ▽
07     To: ▽
08     ▽ The director of the business planning department▽
09     I have made a business trip to the business planning manage-
10     ment headquarter of our Tokyo head office to participate in our
11     business planning meeting among our offices across the country
12     on November 10 to 13 of 1991, the details of which are as
13     follows:▽
14     ▽
15                              Remarks▽
16     ① Destination of Visit▽
17        The business planning management headquarter of our Tokyo
18        head office.▽
19     ② Report of Meeting▽
20        (1) Various opinions were briskly expressed about the main
21            subject "Development of Products under Current Ecological
22            Boom". In particular, a project document (document 1) on
23            "Relation of Water and Green" presented by the planning
24            chief of our Osaka business office drew almost all partic-
25            ipants' attention.▽
26        (2) At an afternoon seminar, we had to change our room which
27            was initially determined to be used for the seminar to a
28            larger room in view of so many participants. The seminar
29            was on the case studies tackled by various companies about
30            the preservation of the environment around us and effects
31            obtained. (documents 2)▽
32        (3) Thereafter, we were grouped into working groups each for a
33            respective subject item and had discussions. (document 3)▽
34     
35     ▽                                                         Period▽
36
```

(NOTE) ▽ ... shows a new line entered

FIG.4

```
ROW    COLUMN POSITION
POSI-  01        10        20        30        40        50        60
TION
 01
 02                              November 15, 1991▽
 03                     (Business planning section) Tadashi NAKAMRA▽
 04
 05              Business Trip Report▽
 06 ▽
 07 ▽
 08 To: The director of the business planning department▽
 09 ▽
 10 I have made a business trip to the business planning manage-
 11 ment headquarter of our Tokyo head office to participate in our
 12 business planning meeting among our offices across the country
 13 on November 10 to 13 of 1991, the details of which are as
 14 follows:▽
 15 ▽
 16                         Remarks▽
 17 1. Destination of Visit▽
 18 The business planning management headquarter of our Tokyo
 19 head office.▽
 20 ▽
 21 2. Report of Meeting▽
 22 ①Various opinions were briskly expressed about the main
 23 subject "Development of Products under Current Ecological
 24 Boom". In particular, a project document (document 1) on
 25 "Relation of Water and Green" presented by the planning
 26 chief of our Osaka business office drew almost all partic-
 27 ipants' attention.▽
 28 ②At an afternoon seminar, we had to change our room which
 29 was initially determined to be used for the seminar to a
 30 larger room in view of so many participants. The seminar
 31 was on the case studies tackled by various companies about
 32 the preservation of the environment around us and effects
 33 obtained. (documents 2)▽
 34 ③Thereafter, we were grouped into working groups each for a
 35 respective subject item and had discussions. (document 3) ▽
 36 ▽                                                    Period ▽

(NOTE) ▽ ... shows a new line entered
```

FIG.5

```
      COLUMN POSITION
ROW   01        10        20        30        40        50        60
POSI-
TION
 01                                                  November 15, 1991▽
 02    ▽
 03              B u s i n e s s   T r i p   R e p o r t▽
 04    ▽
 05    To:  The director of the business planning department▽
 06    ▽
 07                     (Business planning section) Tadashi NAKAMRA▽
 08    ▽
 09        I have made a business trip to the business planning manage-
 10    ment headquarter of our Tokyo head office to participate in our
 11    business planning meeting among our offices across the country
 12    on November 10 to 13 of 1991, the details of which are as
 13    follows:▽
 14    ▽
 15                                 Remarks▽
 16    ▽
 17    1. Destination of Visit▽
 18        The business planning management headquarter of our Tokyo
 19    head office.▽
 20    ▽
 21    2. Report of Meeting▽
 22      ①Various opinions were briskly expressed about the main
 23        subject "Development of Products under Current Ecological
 24        Boom". In particular, a project document (document 1) on
 25        "Relation of Water and Green" presented by the planning
 26        chief of our Osaka business office drew almost all partic-
 27        ipants' attention.▽
 28      ②At an afternoon seminar, we had to change our room which
 29        was initially determined to be used for the seminar to a
 30        larger room in view of so many participants. The seminar
 31        was on the case studies tackled by various companies about
 32        the preservation of the environment around us and effects
 33        obtained. (documents 2)▽
 34      ③Thereafter, we were grouped into working groups each for a
 35        respective subject item and had discussions. (document 3)▽
 36    ▽                                                         Period▽
 37
```

(NOTE)  ▽ ... shows a new line entered

FIG.7 (TABLE 1)

| 08H | 01 | 49 | 64 | 08H | 03 | 11 | 50 | ... | 10H | 08 | 03 | 64 | ... | 09H | 10 | 01 | 48 |

- 08H — BLOCK ATTRIBUTE → BIT INFORMATION (ON)
  - 0: PERIOD IS INCLUDED
  - 1: TITLE SYMBOL INCLUDED
  - 2: DIVIDED BY CONTINUOUS SPACES
  - 3: DIVIDED BY NON-INPUT/NEW-LINE PORTION
  - 4: CHARACTERS CONTINUE TO LINE END
  - 5: UNUSED
  - 6:
  - 7:
- 01 — DOCUMENT LINE POSITION
- 49 — START DIGIT POSITION
- 64 — END DIGIT POSITION

BLOCK 1-1, BLOCK 1-2, BLOCK 1-5, BLOCK 1-7

FIG.10 (TABLE 2)

```
┌─ CONSTITUENT ELEMENT CLASSIFICATION         ┌─ 01:DATE
├─ START MINIMUM DIVIDED BLOCK NUMBER         ├─ 02:CREATOR
├─ LAST MINIMUM DIVIDED BLOCK NUMBER          ├─ 03:SENDER
                                              ├─ 04:DESTINATION
                                              ├─ 05:HEADLINE
                                              ├─ 06:INTRODUCTION
                                              ├─ 07:MAIN TEXT
                                              ├─ 08:POSTSCRIPT
                                              └─ 09:OTHERS
```

| 01 | 01 | 01 | 05 | 02 | 02 | ... | 06 | 05 | 07 |

BLOCK 2-1 | BLOCK 2-2 | BLOCK 2-5

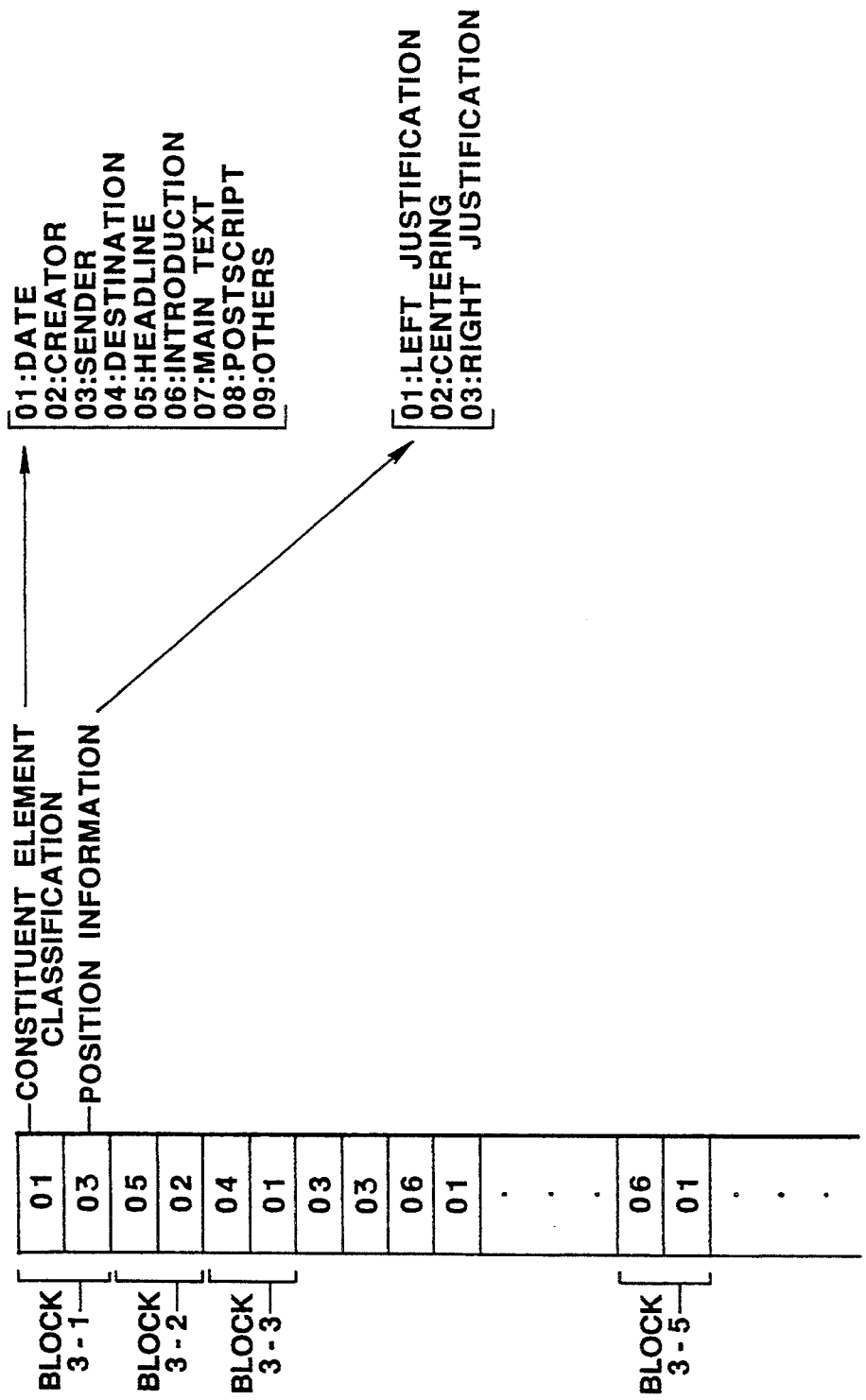

FIG.14 (TABLE 4)
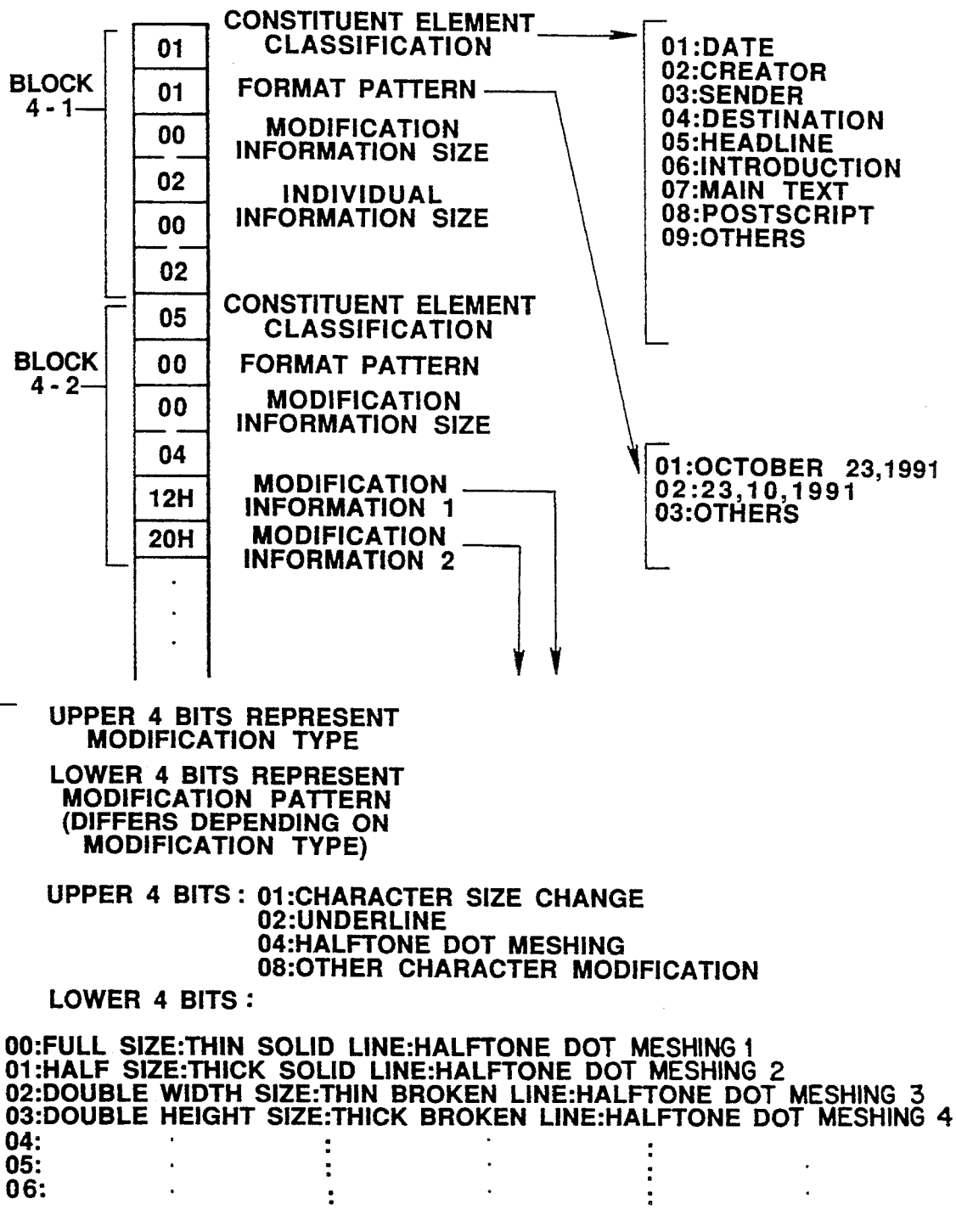

FIG.15 (TABLE 5)

| Block | Value | Label |
|---|---|---|
| BLOCK 5-1 | 01 | CONSTITUENT ELEMENT CLASSIFICATION |
| | 01 | START LINE POSITION |
| | 01 | END LINE POSITION |
| BLOCK 5-2 | 03 | |
| | 02 | |
| | 02 | |
| BLOCK 5-3 | 05 | |
| | 04 | |
| | 04 | |

DOCUMENT PROCESSING APPARATUS FOR EXTRACTING A FORMAT FROM ONE DOCUMENT AND USING THE EXTRACTED FORMAT TO AUTOMATICALLY EDIT ANOTHER DOCUMENT

BACKGROUND OF THE INVENTION

1. Field of the Invention

The present invention relates to a document processing apparatus such as a wordprocessor.

2. Description of the Related Art

Generally, in wordprocessors and the like, a document format is defined by setting the number Of digits per line. A document is created in accordance with this format, and the created document is printed by a printer. In this case, expressions of characters in a display or print operation are dependent on hardware (e.g., a storage capacity, a printer, internal fonts, and a screen resolution) to a high degree. Each wordprocessor exhibits special features in expressing characters. In many wordprocessors, full size, half size, double width size, and double height size characters, and the like can be used, and pitch designation can be performed in units of characters or lines. In addition, they have underline, character decorating, and ruled line functions. In creating a document, many document processing apparatuses can emphasize a specific character or line by drawing an underline or increasing the character size. Such an operation is called character modification.

Such a conventional document processing apparatus allows operators to freely set document formats and create documents. For this reason, if a plurality of types of documents are created, a plurality of document formats (e.g., the order of "title", "date", and the like, and format information such as underline information and character modification information) are created according to different operators, resulting in difficulty in reading. That is, although the conventional apparatuses allow various formats to be set in accordance with the tastes and purposes of operators, whenever an operator tries to create a document according to the format of a document created by another operator, a format change must be performed. Such repetitions of a format changing operation require much labor and time. In addition, in the conventional document processing apparatuses, constituent elements must be input in the same order as that of the constituent elements of a converted format, thus imposing limitations on a document to be converted.

SUMMARY OF THE INVENTION

It is an object of the present invention to analyze and learn the format of a given document so as to cause the format of another document to conform to the format of the given document.

In order to achieve the above object, according to the present invention, there is provided a document processing apparatus comprising:

document data storage means for storing document data;

juxtaposition information analyzing means for analyzing juxtaposition information of first and second document data stored in the document data storage means;

juxtaposition information learning means for learning the juxtaposition information of the first document data, which is analyzed by the juxtaposition information analyzing means, and storing the learned juxtaposition information as learning data used to create a document;

juxtaposition information supply means for supplying the learning data associated with the first document data and stored in the juxtaposition information learning means;

document format converting means for converting the juxtaposition information of the second document data, which is analyzed by the juxtaposition information analyzing means, into the juxtaposition information of the first document data, which is supplied from the juxtaposition information supply means; and output means for outputting the second document data in accordance with the juxtaposition information format-converted by the document format converting means.

According to the present invention, since the apparatus includes the juxtaposition information analyzing means for analyzing juxtaposition information of document data stored in the document data storage means, and the juxtaposition information learning means for learning the juxtaposition information analyzed by the juxtaposition information analyzing means, and outputting the resultant data as learning data to be used to create another document, learned juxtaposition information can be used when a document is to be created, thus easily creating a document having the same layout as that of an original document.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a view showing an input form document 1 in the document processing apparatus;

FIG. 3 is a view showing an input form document 2 in the document processing apparatus;

FIG. 4 is a view showing an interim form document in the document processing apparatus;

FIG. 5 is a view showing an output form document in the document processing apparatus;

FIG. 7 is a view showing a minimum document divided block table (table 1) in the document processing apparatus;

FIG. 10 is a view showing a document constituent element block table (table 2) in the document processing apparatus;

FIG. 11 is a view showing a document layout information table (table 3) in the document processing apparatus;

FIG. 14 is a view showing a document arrangement information table (table 4) in the document processing apparatus;

FIG. 15 1s a view showing a document structure analysis table (table 5) based on the input form document 2 in the document processing apparatus;

DETAILED DESCRIPTION OF THE PREFERRED EMBODIMENT

An embodiment of the present invention will be described below with reference to FIGS. 1 to 17.

FIGS. 1 to 17 show a document processing apparatus 10 of the embodiment, in which the present invention is applied to a wordprocessor.

Figure 1:
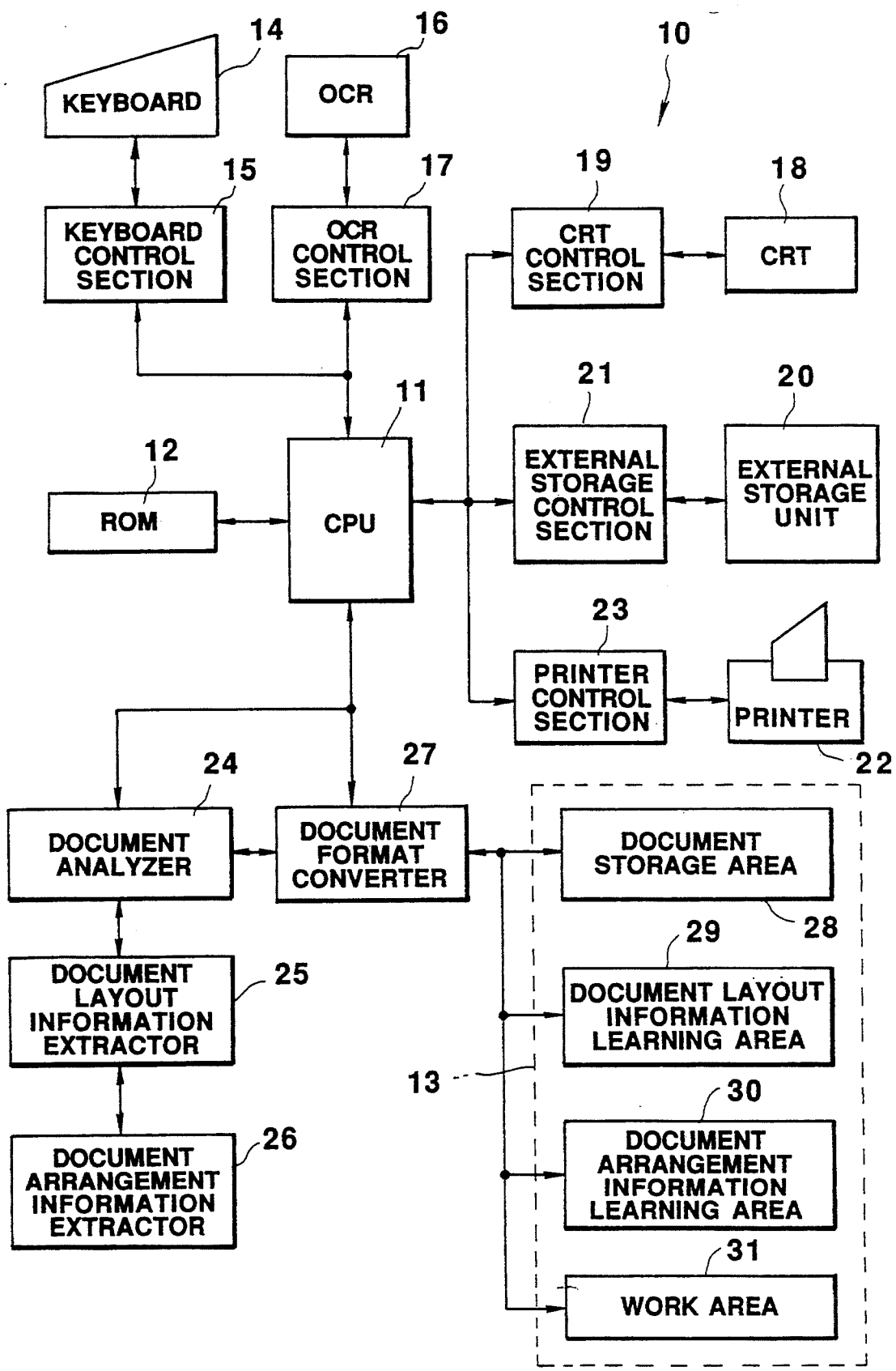
FIG. 1 is a block diagram showing the arrangement of a document processing apparatus.

The arrangement of the apparatus will be described first. FIG. 1 is a block diagram of the document processing apparatus 10. Referring to FIG. 1, reference numeral 11 denotes a CPU for controlling the overall apparatus and also performing control of the following processing (to be described later): minimum document dividing processing, document layout information extraction processing, document arrangement information extraction processing, learning processing, document structure analysis processing, document arrangement conversion processing, and document layout conversion processing. The CPU 11 controls the respective operations of the document processing apparatus 10 in accordance with microprograms stored in a ROM 12. The following components are connected to the CPU 11: the ROM 12 for storing predetermined programs and fixed data such as character pattern data, a RAM 13 for temporarily storing data used for operations, operation results, and the like, a keyboard control section 15 for controlling a keyboard 14, an OCR (optical character reader) control section 17 for controlling an OCR 16, a CRT control section 19 for controlling a CRT 18 for displaying input image data, juxtaposition information, and arrangement information on the screen, an external storage unit 20 such as a floppy disk for storing document files, an external storage control section 21 for controlling data write/read operations with respect to the external storage unit 20, a printer control section 23 for controlling a printer 22 for printing out documents, a document analyzer 24 for analyzing the structure of document data stored in a document storage area 28 (to be described later), a document layout information extractor 25 for extracting layout information about document elements from the analysis result obtained by the document analyzer 24, a document arrangement information extractor 26 for extracting arrangement information about document elements from the analysis result obtained by the document analyzer 24, and a document format converter 27 for converting the document data into a consistent document format according to learning data based on the extracted information.

The ROM 12 is a fixed data memory for storing an IPL (initial program loader) program serving as an OS (operating system) for starting the system, an IOCS (input/output control system) program for controlling input/output operations of the keyboard 14, the OCR 16, the CRT 18, and the external storage unit 20, a keyword dictionary for searching a keyword, character font data, and the like.

The storage area of the RAM 13 is divided into areas according to specific purposes. More specifically, the RAM 13 has the document storage area 28, a document layout information learning area 29, a document arrangement information learning area 30, and a work area 31. The document storage area 28 serves to store input document data. The document layout information learning area 29 serves to store learning data obtained by learning layout information extracted by the document layout information extractor 25. The document arrangement information learning area 30 serves to store learning data obtained by learning arrangement information extracted by the document arrangement information extractor 26. The work area 31 temporarily stores data during operation processing. Of the above-described storage areas, the document layout information learning area 29 and the document arrangement information learning area 30, both of which are designed to store learning data, are constituted by nonvolatile memories such as EEPROMs for holding their stored contents even after the power is turned off, or RAMs backed up by a power supply.

The CPU 11 reads out document data from the external storage unit 20 and stores the data in the document storage area 28 of the RAM 13. In addition, the CPU 11 executes document format learning and document format conversion by controlling the above-described components and the RAM 13. More specifically, the document analyzer 24 controlled by the CPU 11 extracts the document data, stored in the document storage area 28, in units of lines to analyze the structure of the document data (this analysis method will be described in detail later), and extracts document layout information and document arrangement information from the analysis result. These pieces of extracted information are respectively stored, as learning data, in the document layout information learning area 29 and the document arrangement information learning area 30. When nonconsistent document data is to be converted into consistent data, the document data to be converted into consistent data is read out from the document storage area 28, and document format conversion of the document data is performed by the document format converter 27 using learning data read out from the document layout information learning area 29 and the document arrangement information learning area 30. The resultant data is output to the CRT 18 or the printer 22.

By performing the respective processing operations to be described later with reference to FIGS. 6 to 17 (i.e., minimum document dividing processing, document layout information extraction processing, document arrangement information extraction processing, document structure analysis processing, and document arrangement conversion processing), the following tables are created in the work area 31: a minimum document divided block table (table 1), a document constituent element block table (table 2), a document constituent element layout information table (table 3), a document arrangement information table (table 4), and a document structure analysis table (table 5) based on an input form document 2.

The keyboard 14 is an operation panel having keys for inputting alphanumeric characters, hiragana characters, and the like, and function keys such as cursor control keys, an execute key, and a stop (cancel) key. When any one of the keys on the keyboard 14 is operated, the keyboard control section 15 converts the input signal into a predetermined key code corresponding to the key, and outputs the code to the CPU 11. The OCR 16 reads characters printed or handwritten on a sheet of paper or the like by using an optical scanner, and encodes the characters upon recognition and determination processing. The printer 22 serves to print out a document, stored in the RAM 13, in accordance with format information preset by the person who created the document, or document information obtained by document format conversion by means of the learning function.

An operation of the embodiment will be described next.

The document processing apparatus 10 of the embodiment has a document format learning function of learning a document format by analyzing the structure of document data, and a document format converting function of converting the document data (to be converted) into a document having a different format by using the learned document format.

According to the document format learning function, the structure (character connection, constituent element classification, and the like) of a document, which has already been laid out, is discriminated on the basis of title symbols, the presence/absence of a period, keywords, and the like, and format information, or character arrangement information is obtained from the discrimination result, thereby learning the obtained information. According to the document format converting function, after the structure of a document is discriminated by the same means as in the document format learning described above, the respective constituent elements are rearranged in accordance with the learned information, and character arrangement is further performed.

The document format learning function and document format converting functions will be described in detail below with reference to FIGS. 2 to 7.

FIG. 2 shows an input form document 1 to be subjected to document format learning processing. FIG. 3 shows an input form document 2 to be subjected to document format conversion by using the document format learning result obtained by document learning processing. FIG. 4 shows an interim form document 1, which is in the process of conversion to an output form document 1. FIG. 5 shows the output form document 1, which has undergone document format conversion. In the embodiment, document format learning is performed with respect to the input form document 1, and the input form document 2 is converted into the output form document 1 by using the document format learning result obtained by learning processing.

For the sake of descriptive convenience, assume that not more than one document constituent element blocks (to be described later with reference to FIGS. 6 and 7) are present on the same line.

Document Format Learning

○ Document format learning includes minimum document dividing processing (FIGS. 6 and 7), document layout information extraction processing (FIGS. 8 to 11), document arrangement information extraction processing (FIGS. 12 to 14), and learning processing.

In addition, assume that document data for the input form document 1 shown in FIG. 2 is stored in the document storage area 28 of the RAM 13.

Minimum Document Dividing Processing

Figure 6:
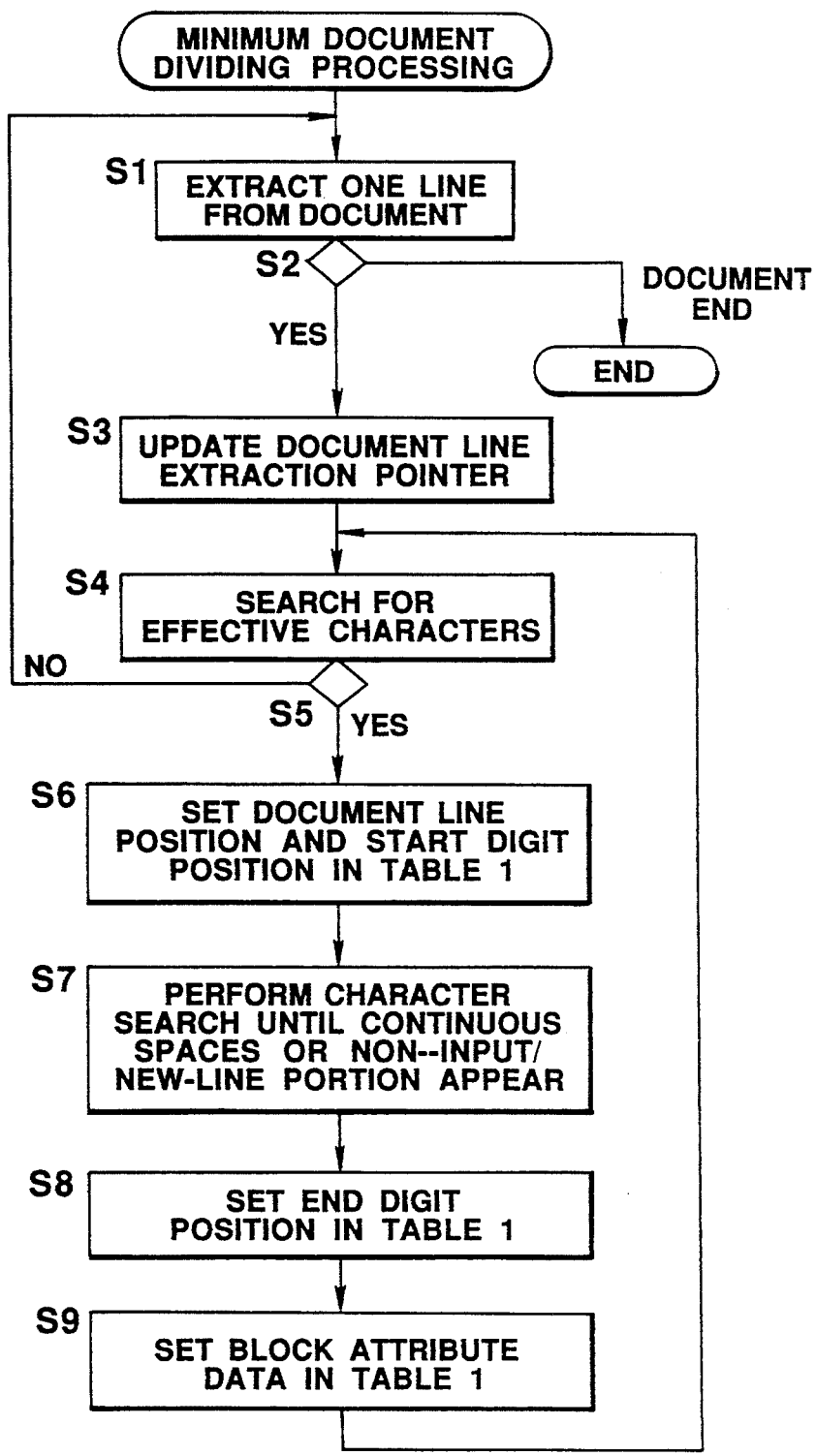
FIG. 6 is a flow chart showing minimum document dividing processing in the document processing apparatus.

FIG. 6 is a flow chart showing minimum document dividing processing for dividing document data into minimum blocks to analyze the structure of the document. By executing the minimum document dividing processing, the minimum document divided block table (table 1) shown in FIG. 7 is created. Referring to FIG. 6, reference symbol Sn (n=1, 2, ...) denotes each step of the flow chart.

In step S1, document data are extracted from the document storage area 28 of the RAM 13 line by line. In step S2, it is checked whether one-line document data is extracted. If NO in step S2, a document end is determined, and the processing of the flow chart is ended. If YES in step S2, the document line extraction pointer is updated in step S3. In step S4, effective characters are searched. If it is determined in step S5 that effective characters are present, the flow advances to step S6. If NO in step S5, the flow returns to step S1 to perform extraction processing of the document data of the next line. In this case, data (e.g., continuous spaces corresponding to a plurality of digits) other than character data regarded as effective characters by an effective character searching operation is skipped. With this effective character searching operation, after one block is created, another block can be created on the same line if, for example, two effective characters are present sandwiching continuous spaces corresponding to a plurality of digits. Therefore, blocks larger in number than the lines of document data may be created.

In step S6, a document line position and a start digit position are set in the minimum document divided block table (table 1) shown in FIG. 7. In step S7, a character searching operation is performed until continuous spaces corresponding to a plurality of digits or a non-input/new-line portion appears. In step S8, an end digit position is set in the minimum document divided block table (table 1). In step S9, "block attribute data" (to be described later) is set in the minimum document divided block table (table 1). The flow then returns to step S4 to repeat the above processing.

With the above-described minimum document dividing processing, the minimum document divided block table (table 1) shown in FIG. 7 is created in the work area 31 of the RAM 13. The minimum document divided block table (table 1) is a block table in which document data extracted from the document storage area 28 line by line are stored in units of minimum blocks 1-1, 1-2, ..., 1-5, ..., 1-7, ..., each delimited by a non-input/new-line portion or continuous spaces corresponding to a plurality of digits. As shown in FIG. 7, one block of the minimum document divided block table is constituted by "document line position", "start digit position", and "end digit position", each based on document delimiter information, and "block attribute"

indicating what delimits the minimum document divided block, and whether the block includes a period/title symbol. The "block attribute" information, the "document line position" information, the "start digit position" information, and the "end digit position" information are set in each of the minimum document divided blocks described above.

The "block attribute" information is set as 8-bit information which is divided into two pieces of 4-bit information. The following are the contents corresponding to the respective bits. When the bit information is ON, bit "0" indicates that the block includes a period; bit "1", that the block includes a title symbol; bit "2", that the block is divided by continuous spaces corresponding to a plurality of digits; bit "3", that the block is divided by a non-input/new-line portion; bit "4", that characters continue to the line end; and bit "5" to bit "7", that these bites are not used. For example, block attribute "08H" of the minimum document divided block table 1-1 indicates the bit information "block is divided by non-input/new-line portion" of the third bit represented by $8=2^3$. Block attribute "10H" of the minimum document divided block 1-5 indicates the bit information "characters continue to line end" of the fourth bit. Block attribute "09H" of the minimum document divided block 1-7 corresponds to "08H" plus the bit information "0", and hence indicates the bit information "block is divided by non-input/new-line portion" of the third bit described above plus the bit information "block includes period".

As described above, in the minimum document dividing processing, the document analyzer 24 extracts document data from the document storage area 28 line by line. The document data extracted line by line are divided into minimum document divided blocks, each delimited by a non-input/new-line portion or continuous spaces corresponding to a plurality of digits, thereby creating a minimum document divided block table (table 1) in the work area 31. At this time, block attributes indicating what delimits each minimum document divided block, and whether each block includes a period/title symbol are also set.

The above minimum document dividing processing will be described in detail below with reference to the input form document 1 (FIG. 2).

The first line (row 1) data is extracted from the document data of the input form document 1 shown in FIG. 2, and a search for effective characters is performed. In this case, since the effective characters are "October 23, 1991", "document line position" is "01" (1st line); "start digit position", "49" (49th digit); and "end digit position", "64" (64th digit). These pieces of information are set, as the minimum document divided block 1-1, in the minimum document divided block table (table 1). In addition, since the effective characters "October 23, 1991" are divided as a minimum document divided block by a new-line portion, "block attribute" is set to be "08H". That is, bit "3: block is divided by non-input/new-line portion" is set as bit information for the block. As described above, the first line data is extracted first. Thereafter, the spaces from the first digit to the 48th digit are skipped, and the characters "October 23, 1991" starting from the 49th digit are read as the minimum document divided block 1-1 of the minimum document divided block table (table 1). Since this minimum document divided block is delimited by the new-line portion, "block attribute" is set to be "08H". The second line data is extracted next. Since there are no effective characters on the second line, no minimum document divided block is created. The third line data is then extracted. Since effective characters "Business Trip Report" are present on the third line, and are delimited by a new-line portion, "block attribute" is set to be "08H"; "document line position", "03"; "start digit position", "11", and "end digit position", "50". These pieces of information are set as the minimum document divided block 1-2 of the minimum document divided block table (table 1). In this manner, the input form document 1 is analyzed up to the last line to create all the minimum document divided blocks.

Document Layout Information Extraction Processing

Figure 8:
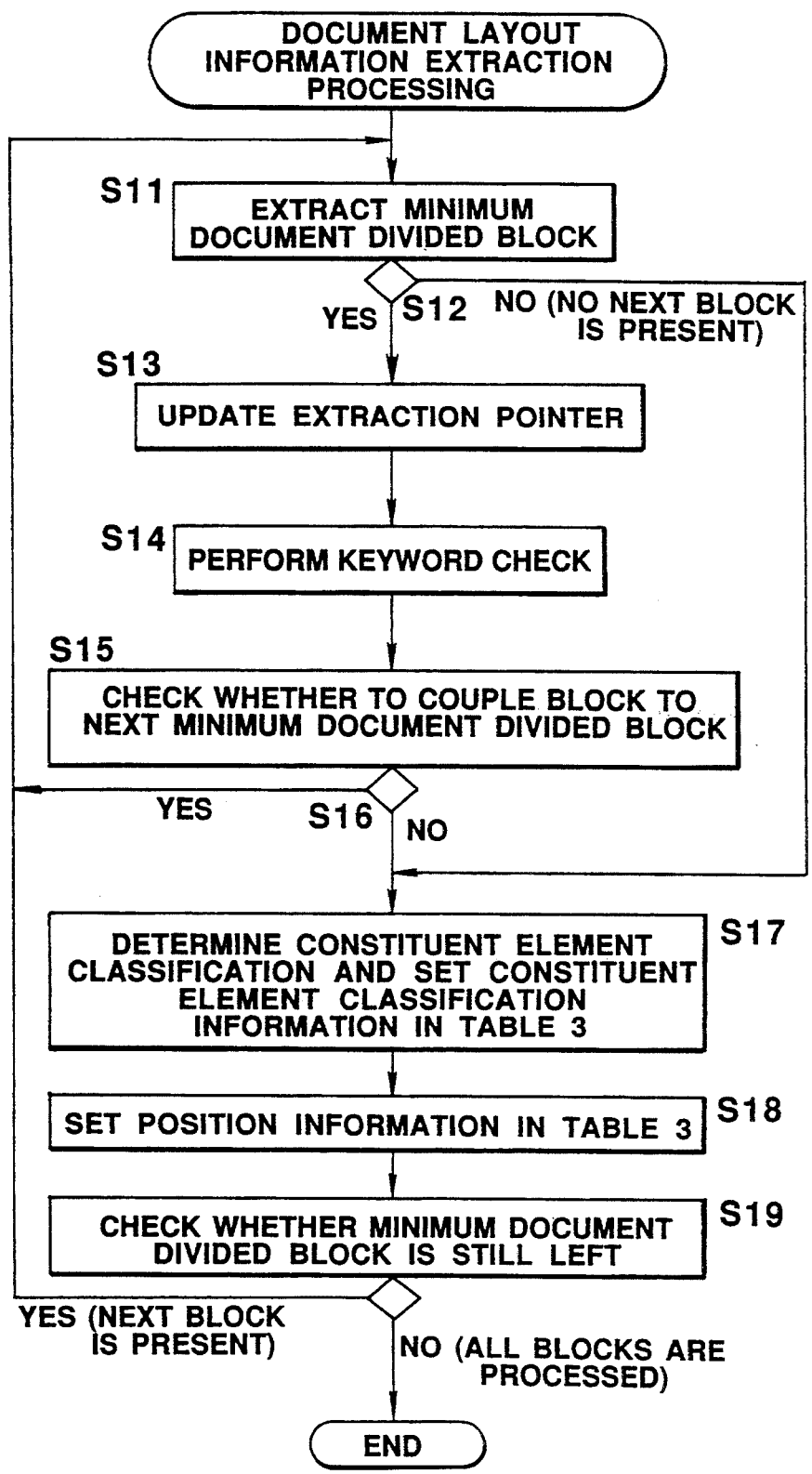
FIG. 8 is a flow chart showing document layout information extraction processing in the document processing apparatus.

FIG. 8 is a flow chart showing document layout information extraction processing for extracting layout information about document elements by analyzing a document data structure. In this flow chart, it is determined whether the above-described minimum document divided blocks can be coupled to each other, and attributes of the blocks are provided. By executing this processing, the document constituent element block table (table 2) shown in FIG. 10 and the document layer information table (table 3) shown in FIG. 11 are created.

In step S11, one of the minimum document divided blocks created by the minimum document dividing processing (FIG. 6) is extracted. In step S12, it is checked whether a minimum document divided block is extracted. If YES in step S12, the extraction pointer is updated in step S13. In step S14, it is checked by referring to the keyword dictionary shown in FIG. 9 whether there is a keyword in the character string of the extracted minimum document divided block.

Figure 9:
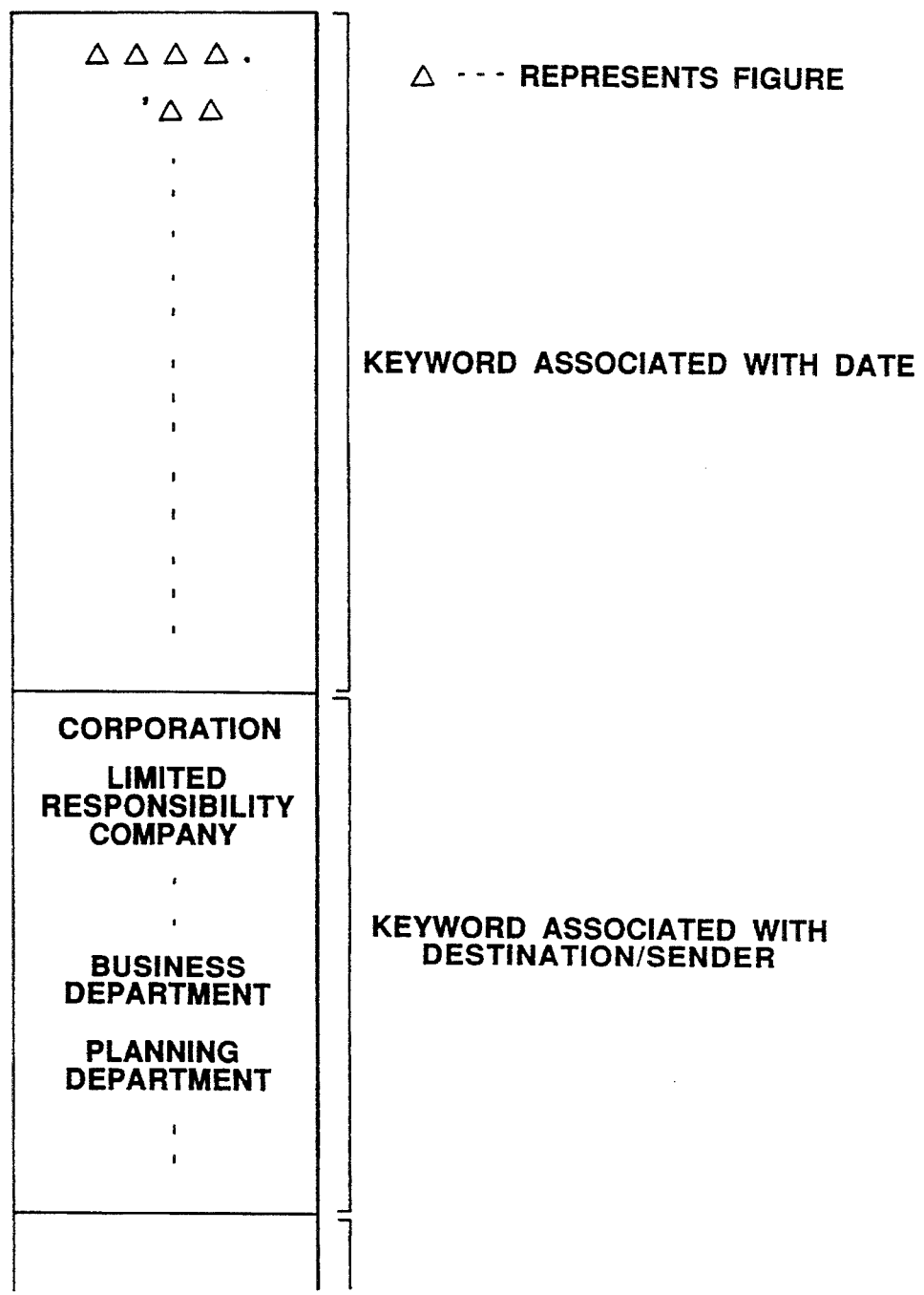
FIG. 9 is a view showing the structure of a keyword dictionary in the document processing apparatus.

In this case, a keyword dictionary is based on terms specific to document constituent elements and is stored in the ROM 12. Keyword dictionary stores a plurality of keyword groups classified by document constituent element classification. In the process of creating a document constituent element block from a minimum document divided block, a keyword dictionary serves as one element for determining the constituent element classification of the block. The keyword dictionary shown in FIG. 9 is an example of such dictionaries. The keyword dictionary shown in FIG. 9 has keywords "ΔΔΔΔ.", "'ΔΔ" (Δ indicates a figure), . . . , and the like associated with dates, and keywords "corporation", "limited responsibility company", . . . , "business department", "planning department", and the like associated with destinations/senders. By referring to this keyword dictionary, it is checked whether a keyword registered in the keyword dictionary is present in the character string of a minimum document divided block. For example, "1991." is present in the character string of the minimum document divided block 1-1 (the divided block corresponding to the first line of the input form document 1 in FIG. 2) in the minimum document divided block table (table 1). This is a keyword constituted by a combination of numbers and a period and associated with a date. In addition, the keyword "business department" associated with a destination/sender is present in the character string of the divided block corresponding to the fifth line of the input form document 1 in FIG. 2. Note that even if a corresponding character string is searched out by referring to a keyword dictionary, the character string cannot be immediately determined as a predetermined document constituent element block, but can be determined only by checking a coupled state of the character string with respect to the next character string/block. For example, since "1991." and the like are present in the character string of the above-described minimum document divided block 1-1, the character string is regarded as a candidate for a keyword of date information in step S14 of performing a keyword check. In addition, since this character string ends at the new-line portion, it is determined as a document constituent element block for date information.

When the flow returns to the document layout information extraction processing shown in FIG. 8, and a keyword check is completed in step S14, it is determined in step S15 whether the minimum document divided block is coupled to the next minimum document divided block. If the blocks are to be coupled to each other, the flow returns to step S11 to repeat the above-described processing, thus coupling the minimum document divided blocks to each other. If the extracted minimum document divided block is not to be coupled to the next minimum document divided block, the flow directly advances to step S17. If it is determined in step S12 that no minimum document divided block is present, the flow advances to step S17. When coupling of the minimum document divided blocks is determined after the keyword is checked in this manner, a document constituent element block is created, thus creating the document constituent element block table (table 2) shown in FIG. 10. In addition, the position information of this document constituent element block is set in the document layout information table (table 3) shown in FIG. 11 in next steps S17 and S18. More specifically, in step S17, "constituent element classification" (FIG. 10) is determined by the keyword check described above and by referring to a title symbol or the like, and this information "constituent element classification" is set in the minimum document divided block table (table 2) shown in FIG. 10. In addition, "start minimum divided block number" and "end minimum divided block number" determined on the basis of the coupling information are set in the document constituent element block table (table 2). Furthermore, the above information "constituent element classification" is set in the document layout information table (table 3) shown in FIG. 11. Subsequently, in step S18, the position information of the document constituent element block is set in the document layout information table (table 3). In step S19, it is checked whether another minimum document divided block to be extracted is present. If it is determined that there is a next minimum document divided block to be extracted, the flow returns to step S11 to repeat the same juxtaposition information extraction processing with respect to the next minimum document divided block. If it is determined that processing of all the blocks is completed, the processing of the flow chart is ended.

With the above-described layout information extraction processing, the document constituent element block table (table 2) shown in FIG. 10 and the document layout information table (table 3) shown in FIG. 11 are created in the work area 31 of the RAM 13.

In the document constituent element block table (table 2), document elements are classified in units of minimum document divided blocks, and the resultant elements are stored in units of document constituent element blocks 2-1, 2-2, . . . . As shown in FIG. 10, each of the document constituent element blocks in the document constituent element block table (table 2) is constituted by "constituent element classification" indicating a constituent element of a minimum document divided block, e.g., a date, a title, or the like, "start minimum divided block number" indicating the start number of the minimum divided block, and "end minimum divided block" indicating the end number of the block. The following are the contents of "constituent element classification". "01" indicates a date; "02", a creator; "03", a sender; "04", a destination; "05", a headline; "06", an introduction; "07", a main text; "08", a postscript; and "09", others. For example, the document constituent element block 2-1 is for a minimum divided block whose start minimum divided block number is "01" (corresponding to the minimum divided block 1-1 in FIG. 7). Since there is no minimum divided block to which this minimum divided block is coupled next, as is apparent from the block attributes of the minimum document divided block table (table 1) shown in FIG. 7, the end minimum divided block number of the block is "01". The information "constituent element classification" of the document constituent element block 2-1 is "01" indicating "date" (see the first line of the input form document 1 in FIG. 2). In addition, the document constituent element block 2-2 is for a minimum divided block whose start minimum divided block number is "02" (corresponding to the minimum divided block 2-1 in FIG. 7). Since there is no minimum divided block to which this minimum divided block is coupled next, as is apparent from the block attributes of the minimum document divided block table (table 1), the end minimum divided block number of the block is "02". The information "constituent element classification" of the document constituent element block 2-2 is "05" indicating "headline" (see the third line of the input form document 1 in FIG. 2). Furthermore, the document constituent element block 2-5 is for a minimum divided block whose start minimum divided block number is "05" (corresponding to the minimum divided block 1-5 in FIG. 7). As is apparent from the eighth to tenth lines of the input form document 1 in FIG. 2, the minimum divided blocks 1-5 to 1-7 in FIG. 7 are coupled to each other. In addition, the information "constituent element classification" of the document constituent element block 2-5 is "06" indicating "introduction". In this case, "introduction" means a statement placed before a main text following "remarks", as indicated in the input form document 1 in FIG. 2.

Each of the document layout information blocks in the layout information table (table 3) is constituted by "constituent element classification" used for the above-described document constituent element block, and "position information" for storing the order number of the block. The contents of "position information" are: "01" indicating left justification; "02", centering; and "03", right justification.

As described above, in the document layout information extraction processing, a document constituent element block table (table 2) is created in the work area 31 by referring to the keyword dictionary shown in FIG. 9 and title symbols (e.g., 1., 2., -, ○, and ☆) with respect to each of the minimum document divided blocks created by the minimum document dividing processing in FIG. 6. At the same time, a document layout information table (table 3) in which the position information of each of the blocks is stored is created in the work area 31. The order in which these pieces of information are stored indicates the order in which the document constituent element blocks are laid out on the document. If, for example, "date" is placed before "headline" on this document layout information table (table 3), it means that "date" is laid out before "headline" even in a document layout. That is, minimum document divided blocks which can be gathered into a predetermined group are coupled to each other, and block attributes representing the document constituent elements of the coupled blocks and their order numbers (position information) are sequentially stored, as learning data, in the document layout information table (table 3). When document format conversion (to be described later) is to be performed, the document layout of document data to be subjected to format conversion is converted in accordance with the document layout information table (table 3).

The above document layout information extraction processing will be described in detail below with reference to the input form document 1.

The first minimum document divided block 1-1 in the minimum document divided block table (table 1) is extracted first. It is detected by referring to the keyword dictionary that a keyword associated with "date" is included in the character string of the minimum document divided block 1-1. The minimum document divided block 1-1 is constituted by only a description about "date", and is placed at the start position of the document. In addition, the block 1-1 is justified to the right. For these reasons, the block 1-1 is determined as a document constituent element block for "date". The next minimum divided block 1-2 is spaced apart from the minimum divided block 1-1 by one line. For this reason, the block 1-2 is not coupled to the block 1-1 and is regarded as another document constituent element block. At this stage, the document constituent element block 2-1, of the document constituent element table (table 2), which has the constituent element classification information "01" (date) is created. Since this document constituent element block 2-1 is constituted by only the minimum divided block 1-1, both "start minimum divided block number" and "end minimum divided block number" are set to be "01" (indicating the minimum divided block 1-1). At the same time, a document layout information block 3-1 of the document layout information table (table 3) is created, and the constituent element classification information "01" and the position information "03" (right justification) are set in the document layout information block 3-1. For example, in the input form document 1, the minimum divided blocks indicated by line positions "08" to "10" are coupled to each other. The minimum divided block 1-5 indicated by the line position "08" has characters which continue to the end of the line, and the minimum divided block 1-6 indicated by the line position "09" has no new-line portion at the end of the line. For these reasons, the minimum divided block 1-5 is coupled to the minimum divided blocks 1-6 and 1-7. In addition, since the minimum divided block 1-7 includes a period and is located before the main text, this document constituent element block is regarded as an introduction. As a result, the document constituent element block 2-5 is created. In this manner, the document constituent element block table (table 2) and the document layout information table (table 3) are created.

When the above-described document constituent element block table (table 2) and document layout information table (table 3) are created, learning based on document layout information (juxtaposition information) can be performed. In the document processing apparatus 10 according to the embodiment, in order to allow learning of a format pattern and arrangement information such as double size information and underline information, the same processing as the layout information extraction processing performed in the above-described document layout information extraction processing is performed as arrangement information (format pattern information, modification information, individual information, and the like) extraction processing in addition to the document layout information extraction processing.

Document Arrangement Information Extraction Processing

Figure 12:
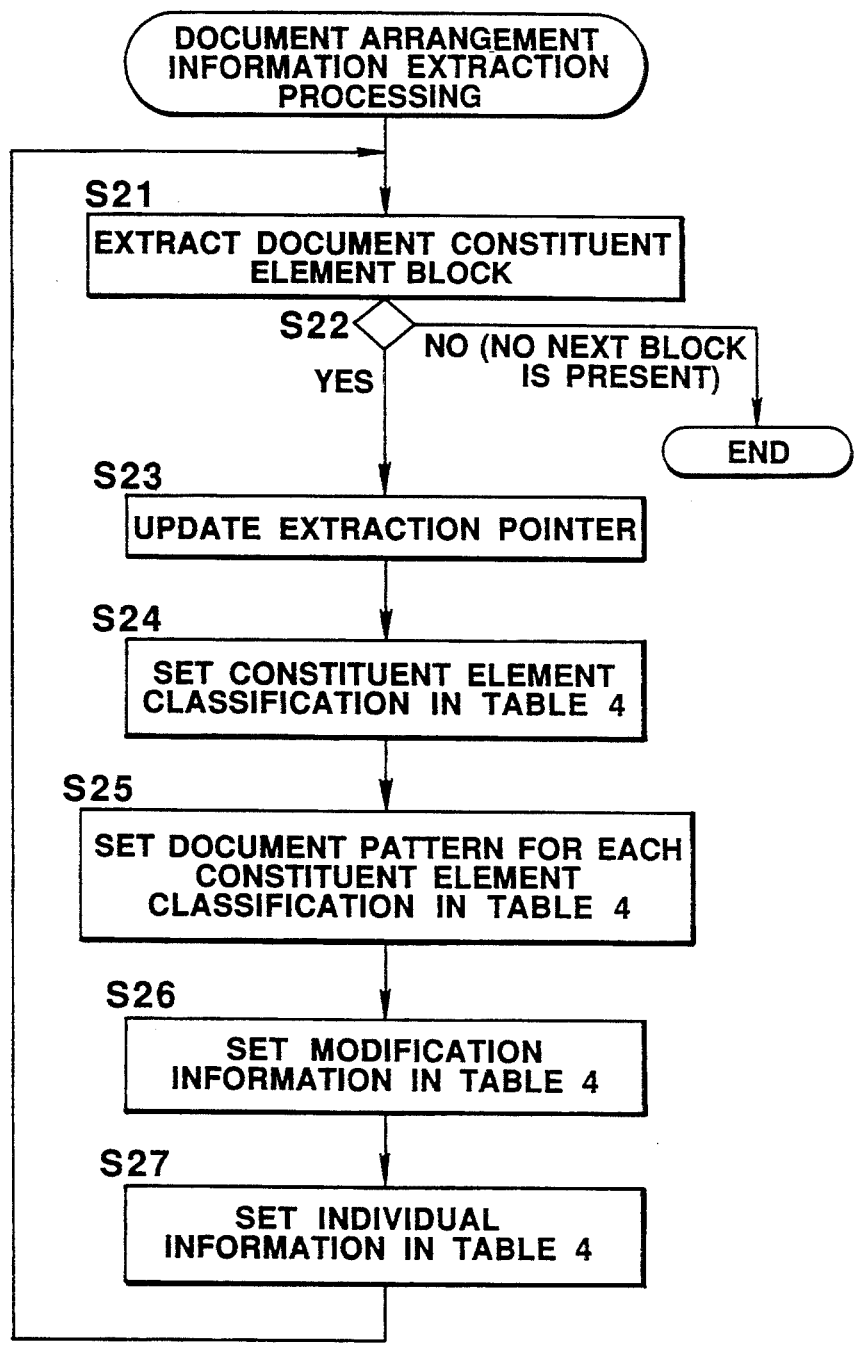
FIG. 12 is a flow chart showing document arrangement information extraction processing in the document processing apparatus.
Figure 13:
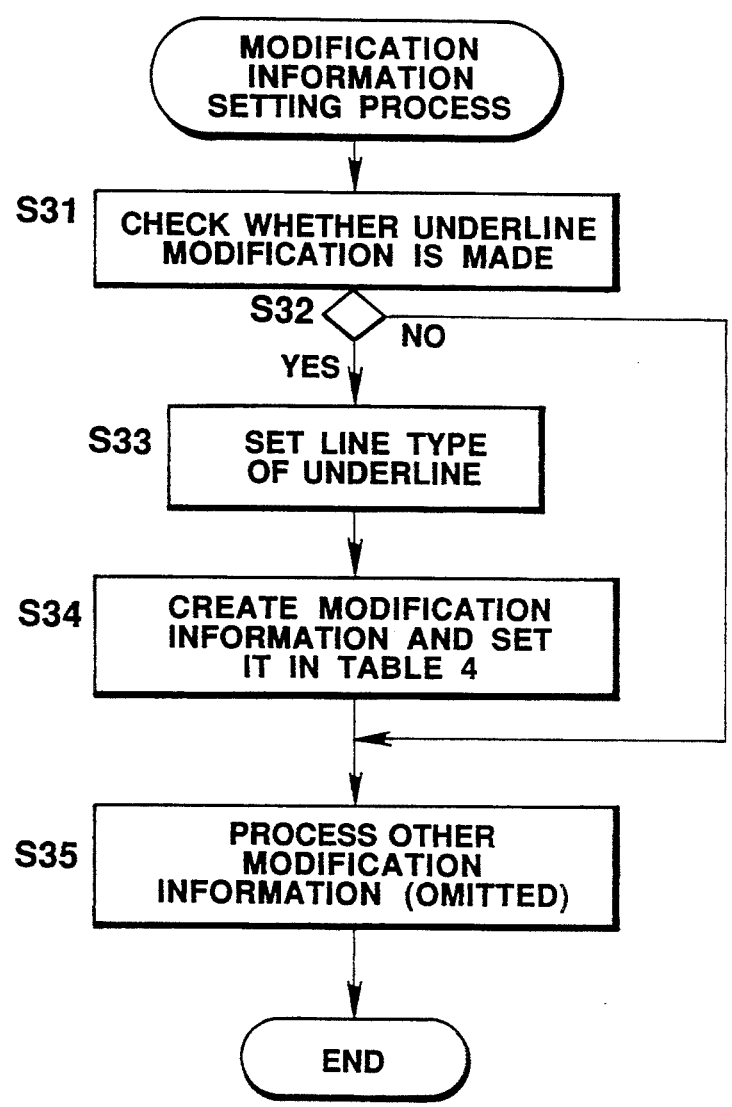
FIG. 13 is a flow chart showing modification information setting processing in the document processing apparatus.

FIG. 12 is a flow chart showing document arrangement information extraction processing for extracting arrangement information of document elements by analyzing a document data structure. By executing this processing, the document arrangement information table (table 4) shown in FIG. 14 is created. FIG. 13 is a flow chart showing modification information setting processing for setting modification information in the document arrangement information table (table 4).

Referring to FIG. 12, in step S21, a document constituent element block is extracted from the document constituent element block table (table 2) created by the above-described document layout information extraction processing (FIG. 8). In step S22, it is checked whether a document constituent element block is extracted. If no document constituent element block is extracted, it is determined that no next block is present, and the processing of this flow chart is ended. If a document constituent element block can be extracted, the extraction pointer is updated in step S23. In step S24, "constituent element classification" (see FIG. 10) of the document constituent element block extracted from the document constituent element block table (table 2) is set in the document arrangement information table (table 4) shown in FIG. 14. That is, the same constituent element classification information as the information "constituent element classification" of the document constituent element block in the document constituent element block table (table 2) is set in the document arrangement information table (table 4). Subsequently, in step S25, "format pattern for each constituent element classification" is set in the document arrangement information table (table 4). In step S26, "modification information" is set in the document arrangement information table (table 4). In step S27, "individual information" is set in the document arrangement information table (table 4). The flow then returns to step S21 to repeat the above-described document arrangement information extraction processing. In this case, if no "modification information" (e.g., double size information, underline information, and halftone dot meshing information) is present in the extracted document constituent element block, only a modification information size (i.e., word information) is set. If "modification information" is present, the information is set in the flow chart in FIG. 13 showing modification information setting processing. If unique arrangement information is indicated by "document constituent element classification", the arrangement information is set in "individual information" of the document arrangement information block.

FIG. 13 is a flow chart showing modification information setting processing for setting modification information in the document arrangement information table (table 4). As an example of modification information, underline modification is set as follows.

In step S31, it is checked whether underline modification is made. If it is determined in step S32 that underline modification is made, line type information (e.g., thin solid underline information or thick solid underline information) of an underline is extracted in step S33. In step S34, modification information is created on the basis of the extracted information and is set in the document arrangement information table (table 4). If it is determined in step S32 that there is no underline modification, the flow directly advances to step 35. In step S35, the same processing as described above is performed with respect to other modification information (e.g., halftone dot meshing information), and the resultant modification information is set in the document arrangement information table (table 4), and the processing of the flow chart is ended.

With the above-described document arrangement information extraction processing, the document arrangement information table (table 4) shown in FIG. 14 is created in the work area 31 of the RAM 13.

The document arrangement information table (table 4) serves to store document constituent element blocks in units of arrangement information blocks 4-1, 4-2, . . . . As shown in FIG. 14, each of the document arrangement information blocks in the document arrangement information table (table 4) is constituted by "constituent element classification" indicating the constituent elements of the document, "format pattern", "modification information size", and "individual information size", and "modification information" to be set when modification information is present. Of these pieces of information, "constituent element classification" is the same information "constituent element classification" as that of the above-described document constituent element block. With regard to "format pattern", if, for example, the information "constituent element classification" is "date", "01" indicates "October 23, 1991"; "02", "23. 10. 1991"; and "03", others. In addition, "modification information size" and "individual information size" indicate the size (represented by the number of bytes) of the above-described document arrangement information block for storing modification information. For example, "0004" indicates that a size corresponding to 4 bytes is ensured within this block.

Furthermore, arrangement information unique to the document constituent element block, such as arrangement information for a main text or the like, e.g., paragraph indentation information, or title number information ("1.", "①", or the like) is stored in "individual information" in the document arrangement information table (table 4).

Assume that "modification information" to be set when modification information is present is constituted by upper 4 bits representing the type of modification, and lower 4 bits representing a modification pattern (which differs depending on a modification type). For example, "01" as upper 4 bits indicates character size change processing; "02", underlining; "04", halftone dot meshing; and "08", other character modification. For example, with respect to character size change processing, underlining, and halftone dot meshing indicated by the upper 4 bits, "00" as the lower 4 bits indicates "full size", "thin solid line", and "halftone dot meshing 1", respectively; "01", "half size", "thick solid line", and "halftone dot meshing 2", respectively; "02", "double width size", "thin broken line", and "halftone dot meshing 3", respectively; and "03", "double height size", "thick broken line", and "halftone dot meshing 4", respectively.

As described above, in the document arrangement information extraction processing, arrangement information (format pattern information, modification information, individual information, and the like) is extracted in units of document constituent element blocks of the document constituent element block table (table 2) created by the document layout information extraction processing in FIG. 8, thus creating the document arrangement information table (table 4) in the work area 31. In addition, unique arrangement information is stored in the individual information portion of the document arrangement information table (table 4) in accordance with document constituent element classification.

The above document arrangement information extraction processing will be described in detail below with reference to the input form document 1.

The first document constituent element block 2-1 is extracted first from the document constituent element block table (table 2). At the same time, the document arrangement information block 4-1 is created in the document arrangement information table (table 4), and the same constituent element classification information as that of the document constituent element block 2-1 is set in the document arrangement information table (table 4). Subsequently, format pattern information for each constituent element classification is set. In this case, since "constituent element classification" is "date", the format pattern classification "01" (pattern "October 23, 1991") for a date is set in the document arrangement information block 4-1. Since no modification is performed on this block, only a size "0002" (word information) including the size of the block is set in "modification information" following "format pattern". Subsequently, the document constituent element block 2-2 is extracted, and its arrangement information is set in the document arrangement block 4-2. In this manner, the document arrangement information table (table 4) is created.

Learning Processing

In learning processing, the document layout information and document arrangement information obtained by the above-described processing are converted, by document format conversion or the like, into another form allowing the use of information, and the pieces of converted information are stored.

More specifically, the document layout information table (table 3) and document arrangement information table (table 4) created by the document analyzer 24 in the work area 31 are respectively stored in the document layout information learning area 29 and the document arrangement information learning area 30 to perform learning. These document layout information learning area 29 and document arrangement information learning area 30 are constituted by nonvolatile memories or the like so as to hold their contents even if the power supply of the document processing apparatus is turned off. In addition, learning data in the learning areas 29 and 30 can be stored in the external storage unit 20.

With the above description, the description of document format learning based on minimum document dividing processing (FIGS. 6 and 7), document layout information extraction processing (FIGS. 8 to 11), document arrangement information extraction processing (FIGS. 12 to 14), and learning processing is completed.

Document format conversion processing for converting a document format on the basis of learned information will be described in detail next.

○ Document Format Conversion

Figure 16:
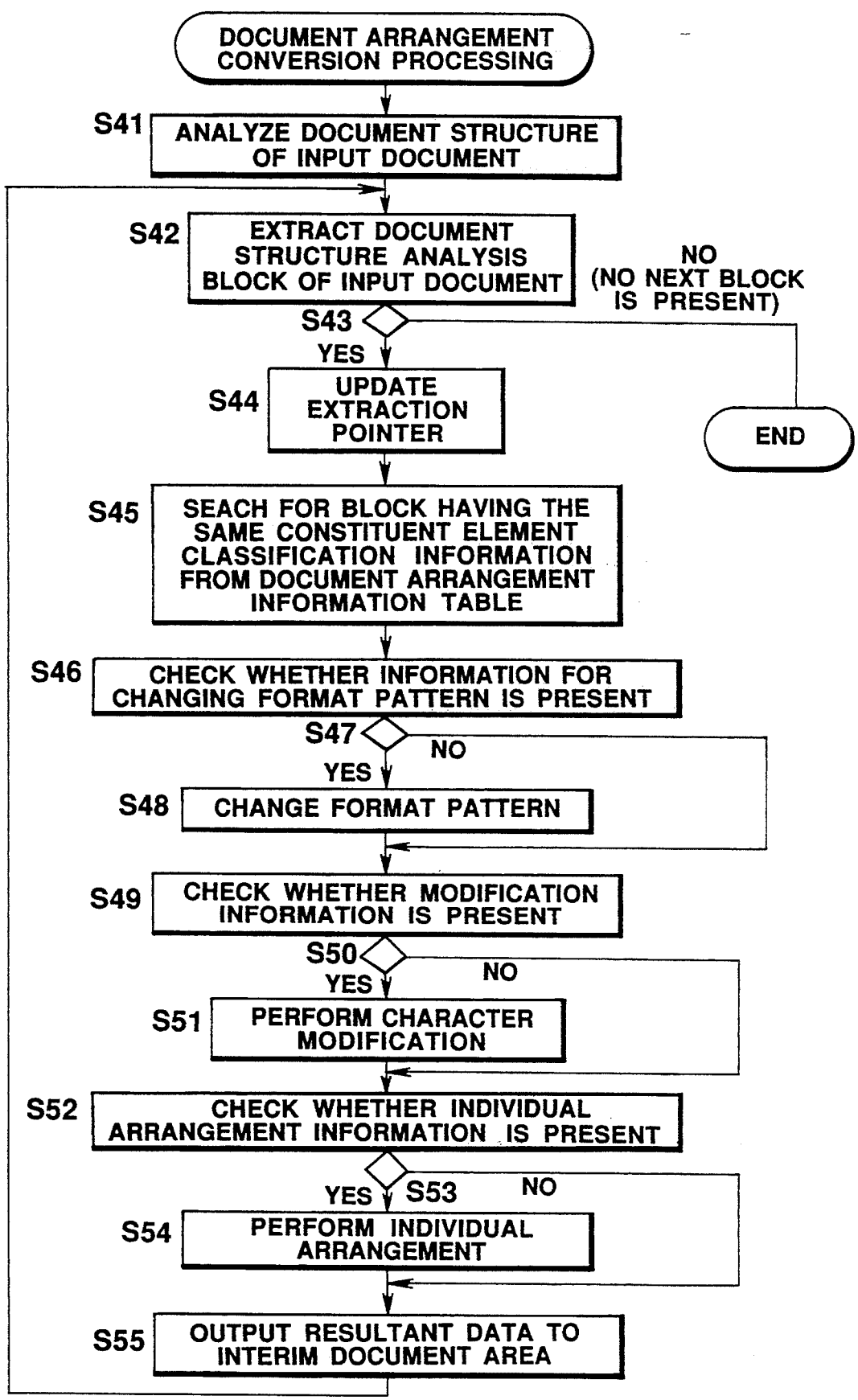
FIG. 16 is a flow chart showing document arrangement conversion processing in the document processing apparatus.
Figure 17:
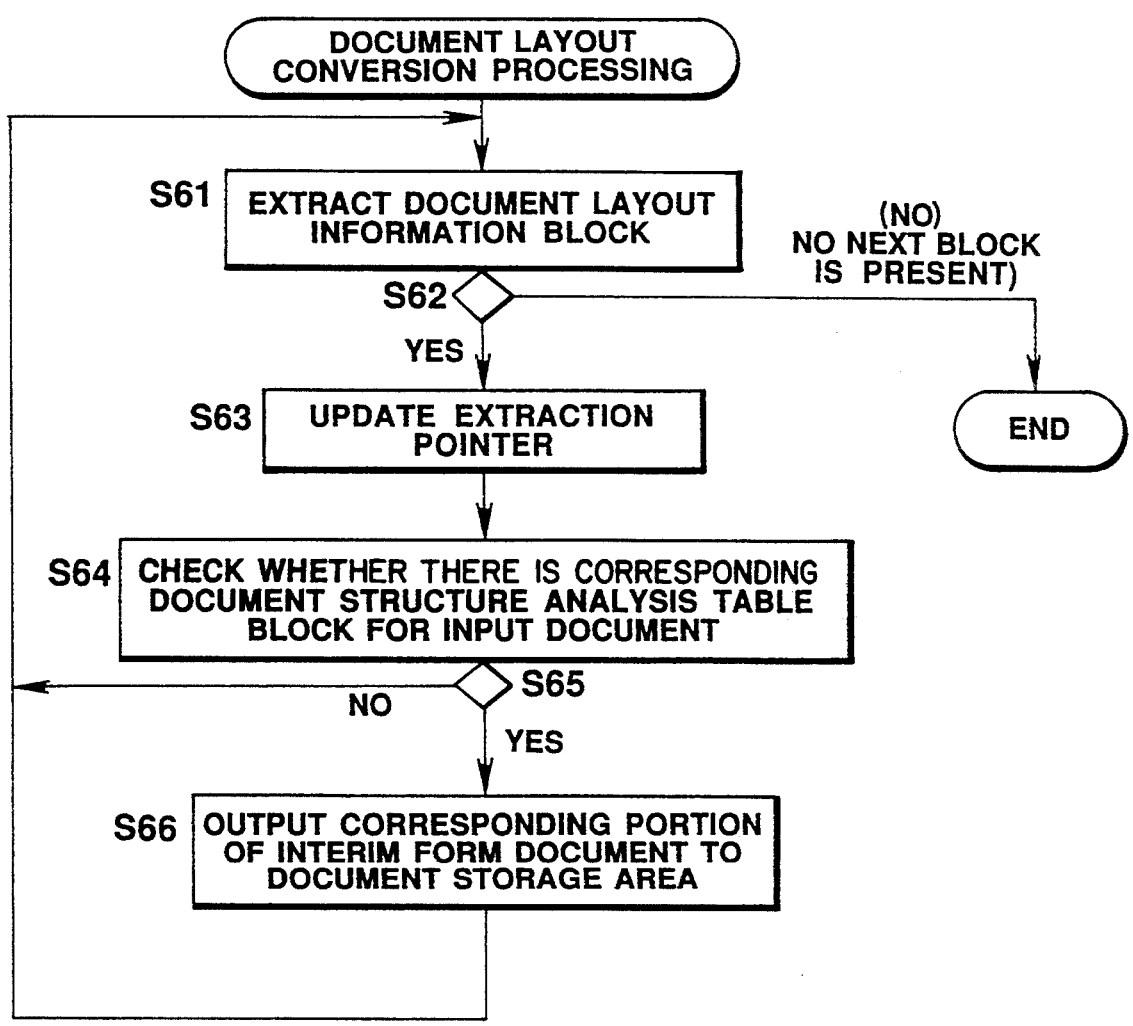
FIG. 17 is a flow chart showing document layout conversion processing in the document processing apparatus.

Document format conversion is constituted by document structure analysis processing (FIG. 15), document arrangement conversion processing (FIG. 16), and document layout conversion processing (FIG. 17).

Assume that the above-described learning processing is completed, and document format learned information have already been stored in the document layout information learning area 29 and the document arrangement information learning area 30. In this state, the input form document 2 shown in FIG. 3 is converted in accordance with the result obtained by learning processing with respect to the input form document 1, and the resultant document is output as the output form document 1.

Document Structure Analysis Processing

In this document structure analysis processing, the structure of an input document is analyzed, and a document structure analysis table (table 5) storing the range and constituent element classification information of each block is created in the work area 31. An analysis procedure in this document structure analysis processing is substantially the same as that in the above-described minimum document dividing processing (FIGS. 6 and 7) and document layout information extraction processing (FIGS. 8 to 11) except that the formats of the resultant tables are slightly different from each other. That is, the document structure analysis table (table 5) can be created by processing similar to the processing shown in FIGS. 6 and 8. The document structure analysis table (table 5) corresponds to the document constituent element block table (table 2) in FIG. 10.

In the above-mentioned document structure analysis table (table 5), the document constituent elements of the respective minimum document divided blocks of the input form document 2 are classified and stored in units of document structure analysis blocks 5-1, 5-2, . . . . Each of the document structure analysis blocks of the document structure analysis block table (table 5) is constituted by "constituent element classification" indicating a document constituent element such as a date or a title, and "start line position" plus "end line position" indicating the range of the block.

Note that document format conversion requires only the document structure analysis table (table 5) but does not require a document arrangement information table based on the input form document 2. More specifically, in document format conversion, after a document structure is determined by the same means as that for format learning, the respective constituent elements are rearranged in accordance with the learned information, and character arrangement is further performed. For this reason, this processing requires only the document arrangement information table (table 4) for the document to be converted to consistent data. Therefore, it is only required to recognize the type of each block, and layout information and arrangement information created in the process of document format learning are added to each block.

Document Arrangement Conversion Processing

FIG. 16 is a flow chart showing document arrangement conversion processing for arranging an input document (input form document 2) in accordance with the arrangement information obtained by learning.

In step S41, the structure of an input document is analyzed. In step S42, a document structure analysis block is extracted from the document structure analysis table (table 5) of the input document. In step S43, it is checked whether a document structure analysis block can be extracted from the document structure analysis table (table 5). In this case, document structure analysis is performed in the same analysis procedure as that for document information in the above-described minimum document dividing processing and document layout information extraction processing. If NO in step S43, it is determined that no block is present, and the processing of this flow chart is ended. If YES in step S43, the extraction pointer is updated in step S44. In step S45, a block having the same information "constituent element classification" as that of the extracted block is searched out from the document arrangement information table (table 4). In step S46, it is checked whether there is information for changing the format pattern. If it is determined in step S47 that there is information for changing the format pattern, the format pattern is changed in step S48. If NO in step S47, the flow directly advances to step S49. More specifically, the format pattern is changed in accordance with learning of a document arrangement block, having the same constituent element classification information as that of the document structure analysis block, stored in the document arrangement information learning area 30. With this operation, the format of the document is changed to a document pattern (e.g., document size) to be realized by document arrangement conversion.

In step S49, it is checked whether modification information is present. If it is determined in step S50 that there is modification information, character modification is performed in step S51, and the flow advances to step S52. If there is no modification information, the flow advances to step S52. In step S52, it is checked whether individual arrangement information is present. If it is determined in step S53 that individual arrangement information is present, individual arrangement processing is performed in step S54, and the flow advances to step S55. If no individual arrangement information is present, the flow advances to step S55. In step S55, the document which has undergone the above-described arrangement conversion such as document pattern changing, character modification, and individual arrangement processing is output, as an interim form document, to the work area 31, thus completing the document arrangement conversion with respect to the extracted block. The flow then returns to step S42 to repeat the above-described processing until no document structure analysis block to be processed is left.

As described above, in the document arrangement conversion processing, a block of the same constituent element in the document arrangement information table (table 4) stored in the document arrangement information learning area 30 is extracted in accordance with the first constituent element block in the document structure analysis table (table 5) in FIG. 15 created by the document structure analysis processing described above. The document is then arranged (e.g., format pattern changing or character modification) in accordance with learning of the document arrangement information block stored in the document arrangement information learning area 30 and having the same constituent element. This document arrangement conversion result is output, as an interim form document, to the work area 31. In this case, the interim document temporarily stored in the work area 31 is a document which has undergone arrangement conversion but has not undergone layout position change. This document is shown as the interim form document in FIG. 4.

The above document arrangement conversion processing will be described in detail below with reference to the input form document 2 and the interim form document 1.

The first block 5-1 is extracted from the document structure analysis table (table 5) based on the input form document 2. The constituent element classification information of the document structure analysis block 5-1 is "date" ("01"), and hence arrangement of the block 5-1 is performed in accordance with the document arrangement information block 4-1 having the same constituent element classification information and stored in the document arrangement information learning area 30. Document data "15, 11, 1991" stored in the document storage area 28 is changed to "November 15, 1991" in accordance with the format pattern information of the document arrangement information block 4-1. Arrangement is normally performed in accordance with modification information and individual information after this operation. However, since the document arrangement information block 4-1 does not include these pieces of arrangement information, the document remains the same. This arranged interim form document is output to the work area 31. With this operation, the interim form document 1 shown in FIG. 4 is created in the work area 31. The interim form document 1 is a document obtained by performing arrangement conversion of the contents of the input form document 2 (FIG. 3) in accordance with the arrangement information of the input form document 1 (FIG. 2). Therefore, in the interim form document 1, the layout position of the input form document 1 is not changed, but only the arrangement information thereof, such as the format pattern is changed. For example, the date "15, 11, 1991" at the line position "01" of the input form document 2 is changed to "November 15, 1991" indicated at the line position "01" of the interim form document 1 in accordance with the arrangement information learned information of the date at the line position "01" of the input form document 2. In addition, the full size headline (title) "Business Trip Report" at the line position "03" of the input form document 2 is changed to "Business Trip Report" as indicated at the line position "03" of the interim form document 1 in accordance with the double sized underlined headline (title) "Business Trip Report" at the line position "03" of the input form document 1. In this manner, the document which has undergone arrangement conversion except for document layout conversion is created, as the interim form document 1, in the work area 31.

The interim form document 1 created in the work area 31 is layout-converted into the output form document 1 (FIG. 5) as the final document by document layout conversion processing (to be described below). With this conversion, a series of document format learning and document format converting operations are completed.

Document Layout Conversion Processing

FIG. 17 is a flow chart showing document layout conversion processing for converting the arrangement of an interim form document, which has undergone arrangement conversion, on the basis of document layout information, and outputting the resultant document as a final output document.

In step S61, a document layout information block is extracted from the document layout information table (table 3) created by the above-described document layout information extraction processing (FIG. 8). In step S62, it is checked whether a document layout information block is extracted. If NO in step S62, it is determined that no next block is present, and the processing of this flow chart is ended. If YES in step S62, the extraction pointer is updated in step S63. In step S64, it is checked whether a corresponding document structure analysis block is present in the document structure analysis table (table 5) for the input document. If YES in step S65, a corresponding portion of the interim form document is output, as a portion of a final document (output form document 1) obtained upon document format conversion, to the document storage area 28 in step S66. The flow then returns to step S61 to repeat the above-described processing until no document layout information block is left. If NO in step S65, the flow returns to step S61 to repeat the above-described processing.

As described above, in the document layout conversion processing, the interim form document created in the work area 31 by the document arrangement conversion processing is output to the document storage area 28 in accordance with the learned document layout information table (table 3) in the document layout information learning area 29.

The interim form document 1 will be described in more detail below. The start block 3-1 is extracted from the document layout information table ( table 3 ), and the document structure analysis block 5-1, in the document structure analysis table (table 5), which has the same constituent element classification information "date" is searched out. A corresponding portion of the interim form document 1 in the work area 31 is output to the document storage area 28. Since "headline" of the document layout information block 3-2 is placed before "sender" in the document layout information table (table 3), a document portion, of the interim form document 1, corresponding to "headline" is output to the document storage area 28. With this operation, the layout positions of "headline" and "sender" of the input form document 2 are switched with respect to each other from those of the output form document 1. In this manner, the entire portion of the interim form document 1 is layout-converted into the output form document 1. Finally, the interim form document 1 having the contents of the input form document 2 is rearranged in accordance with the layout information of the input form document 1.

As has been described above, the document processing apparatus 10 of the embodiment comprises the document analyzer 24 for analyzing the structure of document data stored in the document storage area 28, the document layout information extractor 25 for extracting layout information of document elements from the analysis result obtained by the document analyzer 24, and the document layout information learning area 29 for learning the layout information extracted by the document layout information extractor 25. The document analyzer 24 controlled by the CPU 11 extracts the document data from the document storage area 28 line by line, and analyzes the structure of the document data. The document layout information is extracted from the analysis result, and the extracted information is stored, as learning data, in the document layout information learning area 29. Therefore, if the learned information is displayed or printed by the CRT 18 or the printer 22 when another document is to be created, a document having the same layout as that of the original document can be easily created by referring to the displayed or printed arrangement information.

In addition, the document processing apparatus 10 can easily perform learning of a document format. In reading of document data, if the above-described learning processing is performed by directly reading the data and encoding it through the OCR 16 or the like, the operability can be further improved.

In the embodiment, document constituent element blocks are formed in units of lines. However, the present invention is not limited to this. Even if, for example, structure management is additionally performed in units of digits to create two document constituent element blocks or more on the same line, the document data can be processed in the same manner as described above.

It is apparent that the classification of constituent elements and the extraction and learning of document layout information in the embodiment are merely examples, and that classification and extraction/learning can be performed more precisely. Such operations can be realized by the same method as disclosed in the embodiment.

In the embodiment, format learning is performed with respect to documents which have undergone document layout processing, e.g., the input form documents 1 and 2. However, a solid document (to which juxtaposition and the like are not performed) created without considering a layout can be laid out on the basis of a learned format.

In the embodiment, an example of document format conversion processing is performed by using format learning data obtained by the document format learning function. However, the present invention is not limited to this. For example, format learning data stored in an external storage unit or the like may be read out to a learning area.

In the embodiment, document layout conversion processing is performed after document arrangement conversion processing. It is, however, apparent that arrangement conversion processing can be performed after layout conversion processing.

In the embodiment, the document processing apparatus 10 is applied to a wordprocessor. However, the present invention can be applied to other apparatuses, e.g., personal computers, as long as they have a document format learning function.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A document processing apparatus comprising:
   means for extracting a format of a stored document used as a standard;
   means for storing the extracted format in order to automatically edit another document; and
   document data storage means for storing document data representing said document used as the standard, said document data including character data and delimiter information;
   said extracting means further comprising juxtaposition information extracting means for reading out the document data stored in said document data storage means, and for detecting said delimiter information so as to identify document blocks separated by said delimiter information, and for extracting position information representing positions of the document blocks on said document; and
   said storing means further comprising juxtaposition information storing means for storing, for each document block, the detected delimiter information and the extracted position information, said another document being edited with reference to the delimiter information and the position information stored in said juxtaposition information storing means.

2. An apparatus according to claim 1, wherein said delimiter information includes at least a plurality of space codes and a linefeed code, and said position information includes information indicating start positions and end positions of the document blocks on said document.

3. A document processing apparatus comprising:
   means for extracting a format of a stored document used as a standard;
   means for storing the extracted format in order to automatically edit another document; and
   document data storage means for storing document data representing said document used as the standard, said document data including character data and modification information;
   said extracting means further comprising modification information extracting means for reading out the document data from said document data storage means, with said document data being divided in units of constituent element information into document blocks, and for extracting the modification information from said document blocks; and
   said storing means further comprising modification information storing means for storing, for each document block, the extracted modification information together with the constituent element information, said another document being edited with reference to the constituent element information and the modification information stored in said modification information storing means.

4. An apparatus according to claim 3, wherein said constituent element information includes at least date and information indicating sender and destination, and said modification information includes at least character size and information representing underlining.

5. A document processing apparatus comprising:
   document data storage means for storing, in a predetermined data format, first document data representing a first document which has a first document format, said first document data including character data and delimiter information;
   juxtaposition information extracting means for reading out the first document data stored in said document data storage means, and for detecting said delimiter information so as to identify document blocks separated by said delimiter information, and for extracting position information representing positions of the document blocks on said first document;

juxtaposition information receiving means for receiving position information representing positions of document blocks forming a second document which has a second document format and said predetermined data format;

juxtaposition information altering means for altering the position information extracted by said juxtaposition information extracting means, in accordance with the position information received by said juxtaposition information receiving means; and document data outputting means for outputting the document blocks of said first document data so as to be arranged in the positions represented by the position information altered by said juxtaposition information altering means.

6. A document processing apparatus comprising:

document data storage means for storing, in a predetermined data format, first document data representing a first document which has a first document format, said first document data including character data and modification information;

modification information extracting means for reading out the first document data from said document data storage means, with said first document data being divided in units of constituent element information into document blocks, and for extracting the modification information from said document blocks;

modification information receiving means for receiving modification information contained in document blocks forming a second document which has a second document format and said predetermined data format;

modification information altering means for altering the modification information extracted by said modification information extracting means, in accordance with the modification information received by said modification information altering means; and document data outputting means for outputting said first document data in accordance with the modification information altered by said modification information altering means.

7. A document processing apparatus for extracting a format of a first document used as a standard from said first document, and for automatically editing a second document, said apparatus comprising:

document data storage means for storing, in a predetermined data format, first document data representing said first document and second document data representing said second document, each of said first and second document data including character data and delimiter information;

first juxtaposition information extracting means for reading out the first document data stored in said document data storage means, and for detecting the delimiter information in said first document data so as to identify document blocks separated by said delimiter information, and for extracting position information representing positions of the document blocks on said first document;

juxtaposition information storing means for storing, for each document block, the delimiter information detected by said first juxtaposition information extracting means and the position information extracted by said first juxtaposition information extracting means, said juxtaposition information storing means storing the detected delimiter information and the extracted position information as learning data;

second juxtaposition information extracting means for reading out the second document data stored in said document data storage means, and for detecting the delimiter information in said second document data so as to identify document blocks separated by said delimiter information, and for extracting position information representing positions of the document blocks on said second document;

juxtaposition information altering means for reading out the learning data stored in said juxtaposition information storing means, and for altering the position information extracted by said second juxtaposition information extracting means, in accordance with the position information included in said learning data; and output means for outputting the document blocks of said second document data so as to be arranged in the positions represented by the position information altered by said juxtaposition information altering means.

8. A document processing apparatus for extracting a format of a first document used as a standard from said first document, and for automatically editing a second document, said apparatus comprising:

document data storage means for storing, in a predetermined data format, first document data representing said first document and second document data representing said second document, each of said first and second document data including character data and modification information;

first modification information extracting means for reading out the first document data from said document data storing means, with said first document data being divided in units of constituent element information into document blocks, and for extracting the modification information from said document blocks;

modification information storing means for storing, for each document block, the modification information extracted by said first modification extracting means, together with the constituent element information, said modification information storing means storing said modification information and said constituent element information as learning data;

second modification information extracting means for reading out the second document data from said document data storage means, with said second document data being divided in units of constituent element information into document blocks, and for extracting the modification information from said document blocks;

modification information altering means for reading out the learning data stored in said modification information storing means, and altering the modification information extracted by said second modification information extracting means, in accordance with the modification information included in said readout learning data; and output means for outputting said second document data in accordance with the modification information altered by said modification information altering means.

9. A document processing method comprising the computer implemented steps of:

extracting a format of a stored document used as a standard;

storing the extracted format in order to automatically edit another document;

reading out stored document data, said read out document data representing said document used as the standard, and said read out document data including character data and delimiter information; and detecting the delimiter information in the read out document data;

said extracting step further comprising identifying document blocks separated by said delimiter information, and extracting position information representing positions of the document blocks on said document; and said storing step further comprising storing, for each document block, the detected delimiter information and the extracted position information, said another document being edited with reference to the stored delimiter information and the stored position information.

10. The method according to claim 9, wherein said delimiter information includes at least a plurality of space codes and a linefeed code, and said position information includes information indicating start positions and end positions of the document blocks on said document.

11. A document processing method comprising the computer implemented steps of:

extracting a format of a stored document used as a standard;

storing the extracted format in order to automatically edit another document; and reading out stored document data, said read out document data representing said document used as the standard, said document data including character data and modification information, and said document data being read out with said document data being divided in units of constituent element information into document blocks;

said extracting step further comprising extracting the modification information from said document blocks; and said storing step further comprising storing, for each document block, the extracted modification information together with the constituent element information. said another document being edited with reference to the stored constituent element information and the stored modification information.

12. The method according to claim 11, wherein said constituent element information includes at least date and information indicating sender and destination, and said modification information includes at least character size and information representing underlining.

13. A document processing method comprising the steps of:

reading out first document data stored in a predetermined data format in document data storing means and representing a first document which has a first document format, said first document data including character data and delimiter information;

detecting the delimiter information in the readout first document data so as to identify document blocks separated by said delimiter information, and extracting position information representing positions of the document blocks on said first document;

receiving position information representing positions of document blocks forming a second document which has a second document format and said predetermined data format;

altering the extracted position information in accordance with the received position information; and outputting the document blocks of said first document data so as to be arranged in the positions represented by the altered position information.

14. A document processing method comprising the steps of:

reading out first document data stored in a predetermined format in document data storing means and representing a first document which has a first document format, said first document data including character data and modification information, and being read out with said document data being divided in units of constituent element information into document blocks;

extracting the modification information from said document blocks;

receiving modification information contained in document blocks forming a second document which has a second document format and said predetermined data format;

altering the extracted modification information in accordance with the received modification information; and outputting said first document data in accordance with the altered modification information.

15. A document processing method for extracting a format of a first document used as a standard from said first document, and for automatically editing a second document, said method comprising the steps of:

storing, in a predetermined data format, first document data representing said first document and second document data representing said second document, each of said first and second document data including character data and delimiter information;

reading out the stored first document data, detecting the delimiter information in said first document data so as to identify document blocks separated by said delimiter information, and extracting position information representing positions of the document blocks on said first document;

storing, for each document block, the detected delimiter information and the extracted position information as learning data;

reading out the stored second document data, detecting the delimiter information in said second document data so as to identify document blocks separated by said delimiter information, and extracting position information representing positions of the document blocks on said second document;

reading out the stored learning data, and altering the extracted position information representing the positions of the document blocks on said second document, in accordance with the position information included in said learning data; and outputting the document blocks of said second document data so as to be arranged in the positions represented by the altered position information.

16. A document processing method for extracting a format of a first document used as a standard from said first document, and for automatically editing a second document, said method comprising the steps of:

storing, in a predetermined format, first document data representing said first document and second document representing said second document, each of said first and second document data including character data and modification information;

reading out the stored first document data, with said first document data being divided in units of constituent element information into document blocks, and extracting the modification information from said document blocks;

storing, for each document block, the extracted modification information together with the constituent element information as learning data;

reading out the stored second document data, with said second document data being divided in units of constituent element information into document blocks, and extracting the modification information from said document blocks;

reading out the stored learning data, and altering the modification information extracted from the document blocks of said second document data, in accordance with the modification information included in said learning data; and outputting said second document data in accordance with the altered modification information.

* * * * *